June 14, 1927.
A. AVIS
1,632,264
ENGINE STARTING DEVICE
Filed April 18, 1927
Fig.1.
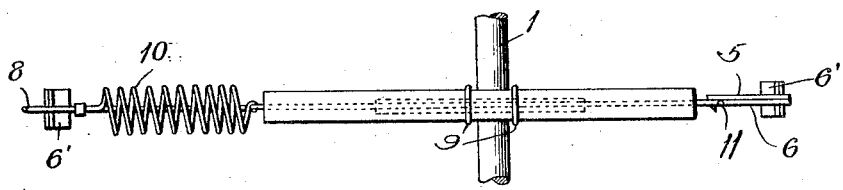
Fig.2.
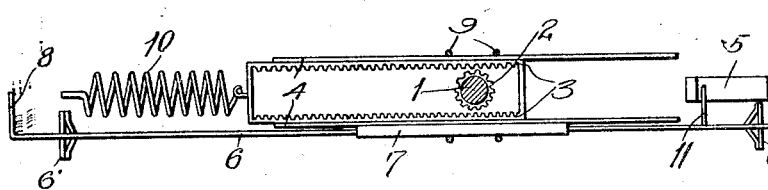
Fig.5.
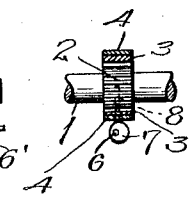
Fig.3.
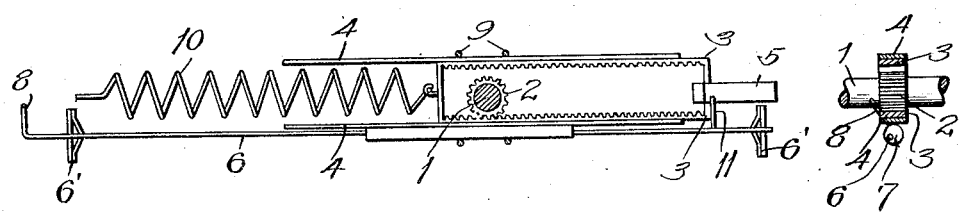
Fig.6.
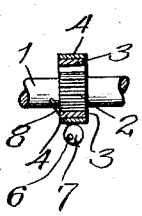
Fig.4.
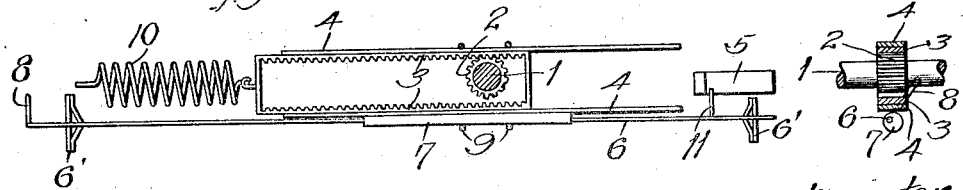
Fig.7.
Inventor:
August Avis
By Emil Bönnelycke
Attorney Patented June 14, 1927.

1,632,264

UNITED STATES PATENT OFFICE.

AUGUST AVIS, OF MALANG, JAVA, DUTCH EAST INDIES.

ENGINE-STARTING DEVICE.

Application filed April 18, 1927, Serial No. 184,779, and in the Netherlands June 16, 1925.

The present invention relates to a starting device for a combustion engine arranged on a vehicle, which device is provided with a frame displaceable vertically with relation to one of the axles of the vehicle.

A similar device is already known in which the horizontal, longitudinal side bars of the frame are constructed at their inner faces as toothed racks, the frame being brought into its starting position by the engine by means of one or more springs; but such device, however, has the drawback that the axle in question must be provided with a complicated toothed wheel with freewheel mechanism.

This invention resides in the provision of a starting device which is simpler and therefore is cheaper. According to the invention, the frame is so arranged that it may be displaced vertically, and the axle is provided with a single fixed toothed wheel or pinion in such a way that it may be coupled either with the one or with the other toothed rack, the single fixed pinion constituting an important simplification of the device. Furthermore, the adjustment may take place according to the invention by means of a rotatable cam shaft.

An embodiment of the invention is illustrated in the accompanying drawing wherein:

Figure 1 is a top view.

Fig. 2 is a side view with the parts in disengaged or mid-position, the axle appearing in section.

Fig. 3 is a side view with the parts in the position in which the spring is tensioned.

Fig. 4 is a side view showing the position for starting.

Figs. 5, 6 and 7 are cross-sections of the toothed rack taken through Figs. 2, 3 and 4, respectively.

Referring more particularly to the drawings, 1 indicates one of the axles of the vehicle, and 2 a pinion fixed thereon. The axle is assumed to be connected in the usual way, through the transmission, with the engine shaft so that the rotation of the axle, when effected in the manner presently explained, may be transmitted to said shaft to start the engine if the clutch is "in." The axle extends transversely through a frame 3 embodying spaced upper and lower horizontal racks and vertical members connecting the rack ends together, and the pinion 2 is disposed within this frame so that it may be engaged with either rack, according as the frame is shifted vertically in one direction or the other. Normally, however, the parts are so arranged that the pinion occupies a mid-position with relation to the frame in which it is out of mesh with both racks; this position being illustrated in Figs. 2 and 5.

The frame 3, in addition to its vertical movement, is mounted to slide endwise in either direction between spaced upper and lower guides 4, beneath and along the latter of which extends a horizontal shaft 6 journaled in fixed bearings 6' and provided with an elongated cylindrical cam or eccentric 7. This cam is maintained in constant engagement with the under side of said lower guide by means of rings 9 which encircle the two guides, the intermediate frame and the cam, so that the rotation of the cam will thus produce a bodily vertical movement of the frame and guides as a unit. In this way, the rack frame can be alternatively raised or lowered by turning the cam shaft 6 in one direction or the other, thereby bringing either its lower or its upper rack into mesh with the pinion as the case may be. The cam shaft is provided for that purpose with a handle 8 at its front end; and it is to be understood that in actual practice said handle, which normally stands upright when the various parts are in mid-position, as indicated in Figs. 2 and 5, has to be moved through a comparatively short angular distance, say 45°, to one side or the other of such position to effect the required movements of the rack frame.

At its front end the rack frame has connected to it one or more coil springs 10; and behind said frame there is arranged a resilient pawl or detent 5 which is designed to be hit by and to snap over the rear end member of the frame when the latter reaches the end of its backward movement. The cam shaft 6 is preferably utilized to release this pawl from the frame, and for that purpose it is provided with a laterally-projecting finger 11 which, in the mid-position of the parts, rests against the pawl, as represented in Figs. 1 and 2.

The operation is substantially as follows:—Starting with the parts in Fig. 2 position, and the pinion 2 out of mesh with both racks, and assuming that the vehicle is in motion and that it is desired to tension spring 10 to store up power therein, the handle 8 is turned slightly in a direction to move finger 11 away from pawl 5 into the position represented in Fig. 6 and, at the same time, cause cam 7 to raise the rack frame and bring the lower rack into mesh with the pinion, as shown in Fig. 3. The pinion, being rotated by the axle 1 to which it is secured, then moves the frame backward (to the right) until its rear member engages pawl 5, the click produced thereby giving notice of such engagement. Immediately that occurs, the driver turns the handle 8 back to its original position in which it stands upright (Fig. 5), in order to depress the rack frame and thereby release the lower rack from the pinion, as otherwise the rearward movement of the frame would continue and its front end would strike against the pinion. During this movement, the spring 10 is stretched and is held in such condition by the engagement of pawl 5 with the rear end member of the rack frame, as represented in Fig. 3.

In order to start the engine, when the vehicle is at rest, the clutch is first of all thrown in to enable the rotary movement of the axle to be transmitted to the engine shaft, and then the handle 8 of the cam shaft 6 is turned from its upright or mid-position (Figs. 2 and 5) to the position indicated in Figs. 4 and 7. This movement of the cam shaft causes the cam to pull the rack frame downward and thus mesh the pinion with the upper rack, while at the same time the finger 11 disengages the pawl 5 from the frame. The spring 10 thereupon contracts, pulling the frame toward the left and thereby driving pinion 2 and axle 1 and causing the vehicle to move forward. The clutch having already been thrown in, the rotation of the axle is transmitted to the engine which starts, and handle 8 is again moved back to mid-position to disengage the rack frame from the pinion, all parts then being in their respective initial positions as illustrated in Figs. 1, 2 and 5. Thereafter, the handle is operated in the manner above described to re-tension the starting spring 10 and lock the rack frame in cocked position (Fig. 3).

It is to be understood that the angular movement of handle 8 (and, hence, of finger 11) from the mid-position of Fig. 2 to either side thereof is comparatively slight, being only about 45°, as previously stated and as will be apparent from a comparison of Figs. 6 and 7 with Fig. 5. Due to that fact, and to the resilience of pawl 5, the finger 11, in moving from its mid-position to its Fig. 7 position to release the pawl, will merely press back the pawl and will not pass beyond it; so that when said finger moves back to its upright position, the pawl will follow it and will be in position for a new engagement with and disengagement from the frame.

This device is preferable to the usual electric starting devices because it is much cheaper and simpler; and for vehicles, such as autobusses, which must often stop and start, and in which the accumulator may become discharged, the application of the invention brings special advantages.

The invention is not restricted to the precise details shown and described, as such details are only given by way of example.

I claim as my invention:—

1. An engine starting device, comprising an elongated frame mounted for both endwise and vertical movement and embodying spaced upper and lower horizontal racks; a shaft extending transversely through the space between the racks and provided with a pinion; a starting spring connected to one end of the frame for pulling it endwise in one direction; a spring detent automatically engageable with the other end of the frame when the latter has moved a predetermined distance in the opposite direction; a shaft provided with a cam which is permanently connected with said frame for positively moving it vertically in either direction, so as to bring either rack into engagement with said pinion; and means operated by the rotation of the cam shaft for releasing said detent.

2. An engine starting device, comprising an elongated frame mounted for both endwise and vertical movement and embodying spaced upper and lower horizontal racks; a shaft extending transversely through the space between the racks and provided with a pinion; a starting spring connected to one end of the frame for pulling it endwise in one direction; a spring detent automatically engageable with the other end of the frame when the latter has moved a predetermined distance in the opposite direction; a shaft provided with a cam which is permanently connected with said frame for positively moving it vertically in either direction, so as to bring either rack into engagement with said pinion; and a projection on the cam shaft to engage and release said detent during the rotation of that shaft.

3. An engine starting device, comprising an elongated frame embodying spaced upper and lower horizontal racks; spaced upper and lower horizontal guides between which said frame is arranged for endwise sliding movement; a shaft extending transversely through the space between the racks and provided with a pinion; a shaft extending along the under side of the lower guide and provided with an elongated cam for action directly on that guide; clip means encircling said guides, frame and cam to impart a bodily vertical movement in either direction to the frame and guides as a unit when the cam shaft is rotated, so as to bring either rack into engagement with said pinion; and a starting spring connected to one end of the frame to move it endwise in one direction when the pinion is in mesh with one rack.

4. An engine starting device, comprising an elongated frame embodying spaced upper and lower horizontal racks; spaced upper and lower horizontal guides between which said frame is arranged for endwise sliding movement; a shaft extending transversely through the space between the racks and provided with a pinion, a shaft extending along the under side of the lower guide and provided with an elongated cam for action directly on that guide; clip means encircling said guides, frame and cam to impart a bodily vertical movement in either direction to the frame and guides as a unit when the cam shaft is rotated, so as to bring either rack into engagement with said pinion; a starting spring connected to one end of the frame to move it endwise in one direction when the pinion is in mesh with one rack; a spring detent automatically engageable with the other end of the frame when the latter has moved a predetermined distance in the opposite direction; and means operated by the rotation of the cam shaft for releasing said detent.

In testimony whereof I affix my signature.

AUGUST AVIS.